Nov. 7, 1961 — C. H. BECKER ET AL — 3,007,725
FASTENING DEVICE
Filed June 8, 1959
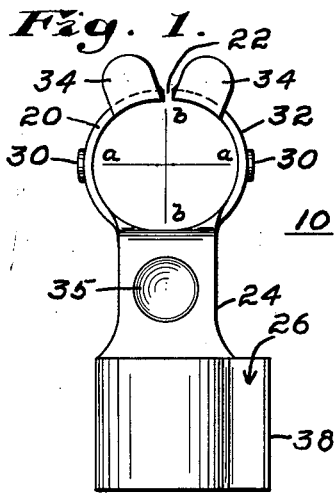
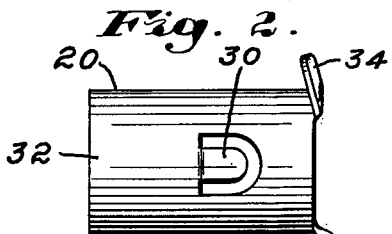
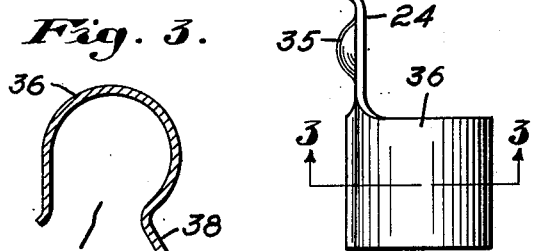
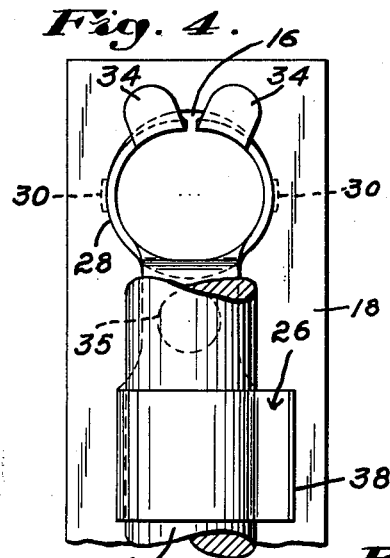
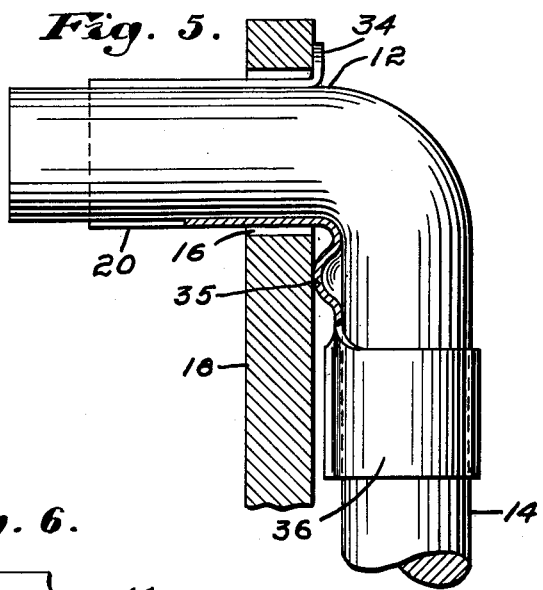
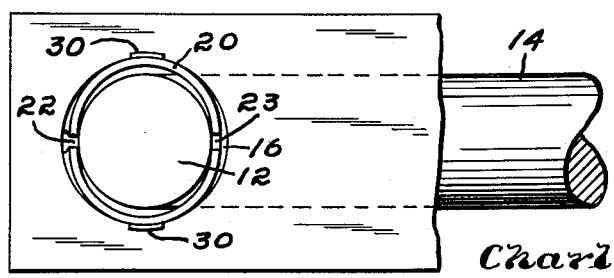
Inventors:
Charles H. Becker &
Clarence W. Cochran.
by James B. Tippany Jr.
Att'y.

3,007,725
FASTENING DEVICE

Charles H. Becker, Braintree, and Clarence W. Cochran, Belmont, Mass., assignors to United-Carr Fastener Corporation, Cambridge, Mass., a corporation of Delaware Filed June 8, 1959, Ser. No. 818,963
2 Claims. (Cl. 287—20.5)

This invention relates generally to fastening devices and specifically to an improved rod end clip for retaining a rod having a circular diameter in a clevis plate.

In the automotive industry various means have heretofore been used to secure angular rods on plates mainly in door lock mechanisms and acceleration connections where straight line forces are converted to rotary motion. Tolerances in existing devices are normally large resulting in excessive play and due to vibrating action in a moving vehicle produce an objectionable rattle. It is also desirable to have a clip which may be firmly retained in the clevis plate when the rod is removed to vary its length for adjustment purposes.

The object of the invention is to provide an anti-rattle rod end clip for retaining a lever in assembly with a clevis plate or the like.

Another object of this invention is to provide a fastening device which may be installed and retained in a clevis plate prior to the installation of the lever.

A further object of this invention is to provide a resilient rod end clip which is adapted for a wide range of clevis plate hole diameters.

Further objects of this invention will in part, be obvious, and will, in part, appear hereinafter.

In the drawings:

FIG. 1 is a top plan view of the rod end clip illustrating the features of the invention;

FIG. 2 is a view in side elevation of the clip;

FIG. 3 is a view in section taken on line 3—3 of FIG. 2;

FIG. 4 is a top plan view of the clip similar to FIG. 2 illustrating the clip inserted in the plate with the lever partly broken away;

FIG. 5 is a view in side elevation, partly in section of the assembly shown in FIG. 4;

FIG. 6 is a bottom plan view of the assembly of FIG. 5.

Referring to the drawing there is illustrated a rod end clip 10 which is adapted to retain an angular portion 12 of a lever 14 within an aperture 16 of a clevis plate 18.

The clip 10 comprises a tubular barrel portion 20 having a slot 22 extending its length to provide radial flexibility and an opposing slot 23 extending approximately midway its length, and an angularly extending arm 24 having a lever engaging portion 26. The tubular barrel portion 20 is elliptical shaped presenting a major axis designated by line $a$—$a'$ and a minor axis designated by line $b$—$b'$. The aperture 16 is of a generally circular configuration so that when the tubular barrel portion 20 is inserted within the aperture, the major axis bears against the walls 28 of the aperture 16. Tongue members 30 are formed in the lateral walls 32 of the tubular barrel 20 for a purpose to be described hereinafter. Tabs 34 extend at substantially right angles to the barrel portion 20 and inclined downwardly in the direction of the barrel and are adapted to abut against the top surface of the clevis plate 18 to act as stop member defining the limits of axial penetration within the aperture 16, and by utilizing the resilient characteristics inherent in the tabs limits vibratory action. The angularly extending arm 24 has a detent 35 formed on its lateral surface to provide a relatively frictionless bearing surface during movement of the lever arm. The lever engaging portion 26 is in spaced relation to the tubular barrel 20 formed integral with the arm 24 and comprises a resilient leg 36 extending upwardly from one edge of the arm 24 and curved so as to lie in spaced parallel relationship to the arm 24 having the distal end 38 inclined away from the opening 40 to act as a lead.

Referring now to FIGS. 4, 5 and 6, the rod end clip 10 is shown assembled in a clevis plate 18 with the lever 14 clipped into engagement. The barrel portion 20 may be tapered to facilitate insertion with the clevis plate and the clevis plate 18 is firmly retained between the tongues 30 abutting the under surface of the plate and the tabs 34 bearing against the top surface. One of the unique features of this invention is that the rod end clip may be inserted within clevis plate independently of the lever and retained in assembly. The arm 12 which extends at substantially a right angle to the lever 14, when inserted in the tubular barrel portion 20, causes it to radially flex, widening the slot 22 and frictionally engaging the arm 12 and then, by rotating the lever 14, engagement of the lever with the portion 26 is accomplished.

In some instances, it is desirable to insert the lever 14 within the clip 10 prior to assembly within the clevis plate 18 in which case the flexible nature of the tubular barrel 20 portion along the axes $a$—$a'$ and $b$—$b'$ in addition to the slight lead afforded by the taper will permit insertion within the aperture 16.

Since certain other obvious modifications may be made in this device without departing from the scope of the invention, it is intended that all matter contained herein be interpreted in an illustrative and not in a limiting sense.

W claim:

1. A one piece clip including a substantially elliptical barrel portion adapted for axial insertion within a complementary work aperture and freely rotatable therein and a lever engaging arm extending normal to said barrel, said barrel portion having a longitudinal slot extending its length so as to present radially yieldable opposed spring members, said barrel adapted to resiliently receive in telescopic engagement a portion of said lever, resilient tongues extending outwardly from the lateral surface of said spring members and disposed intermediate their distal ends and tabs extending at substantially right angles to the periphery, said tabs cooperating with the tongue members to retain the clip within the work after the barrel portion has been snapped into position within the work aperture, a detent formed on the medial lateral surface of said arm adapted for sliding engagement with one surface of said work surface and snap fastening means for lateral engagement with a lever.

2. A fastening assembly comprising a clip member, an apertured clevis plate and a lever, said clip member adapted for axial insertion within the apertured clevis plate to frictionally retain the lever having a right angular bend adjacent one end thereof, said clip member comprising a resilient substantially elliptical tubular barrel portion, said barrel portion being bifurcated by a longitudinal slot so as to present radially yieldable semi-circular spring members, said spring members having a plurality of tongues extending outwardly from their medial lateral surface and disposed intermediate their distal ends, tabs formed on one periphery adapted to cooperate with said tongues to retain the clip member in assembly within the apertured clevis plate, an integral arm extending normal to said barrel having detent means disposed thereon and snap fastening means for lateral snap engagement with the shank of said lever, one portion of said lever adapted for axial telescopic engagement within said tubular barrel portion, the entire assembly freely rotatable within said clevis plate.

(References on following page)

References Cited in the file of this patent

UNITED STATES PATENTS

| | | | |
|---|---|---|---|
| 565,672 | Daniels | Aug. 11, | 1896 |
| 1,965,882 | Cook | July 10, | 1934 |
| 1,966,599 | Roualet | July 17, | 1934 |
| 2,166,916 | Lombard | July 18, | 1939 |
| 2,244,975 | Tinnerman | June 10, | 1942 |
| 2,318,853 | Hall | May 11, | 1943 |
| 2,578,639 | Bedford | Dec. 11, | 1951 |
| 2,588,251 | Kost | Mar. 4, | 1952 |
| 2,618,033 | Tinnerman et al. | Nov. 18, | 1952 |